US010602139B2

(12) United States Patent
Wu et al.

(10) Patent No.: US 10,602,139 B2
(45) Date of Patent: Mar. 24, 2020

(54) EMBEDDED MULTIMEDIA SYSTEMS WITH ADAPTIVE RATE CONTROL FOR POWER EFFICIENT VIDEO STREAMING

(71) Applicant: OmniVision Technologies, Inc., Santa Clara, CA (US)

(72) Inventors: Jiyan Wu, Singapore (SG); Jilai Qian, Santa Clara, CA (US); Jun Wei, Singapore (SG); Shunbo Mou, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 60 days.

(21) Appl. No.: 15/855,700

(22) Filed: Dec. 27, 2017

(65) Prior Publication Data
US 2019/0200013 A1 Jun. 27, 2019

(51) Int. Cl.
*H04N 19/115* (2014.01)
*H04N 19/164* (2014.01)
*H04N 19/177* (2014.01)
*H04N 19/42* (2014.01)
*H04N 19/152* (2014.01)

(52) U.S. Cl.
CPC ......... *H04N 19/115* (2014.11); *H04N 19/152* (2014.11); *H04N 19/164* (2014.11); *H04N 19/177* (2014.11); *H04N 19/42* (2014.11)

(58) Field of Classification Search
None
See application file for complete search history.

(56) References Cited

U.S. PATENT DOCUMENTS

| | | | | | |
|---|---|---|---|---|---|
| 5,566,371 | A | * | 10/1996 | Ogawa | G11C 7/1051 365/230.03 |
| 5,777,631 | A | * | 7/1998 | Greene | G09G 5/39 345/546 |
| 5,784,633 | A | * | 7/1998 | Petty | G06F 13/126 375/220 |
| 6,831,662 | B1 | * | 12/2004 | Lum | G09G 3/3622 345/100 |

(Continued)

OTHER PUBLICATIONS

Proposed amendment.*
(Continued)

*Primary Examiner* — Mohammad J Rahman
(74) *Attorney, Agent, or Firm* — Christensen O'Connor Johnson Kindness PLLC

(57) ABSTRACT

A system includes an image sensor and a sending controller. The image sensor to generate video data at a source bit rate. The sending controller is coupled to the image sensor to transmit communication data representative of the video data. The sending controller includes one or more processors coupled to memory. The memory includes instructions, which when executed by the sending controller causes the system to perform operations. The operations include determining a first bit rate to encode a first portion of the video data, generating a first video packet representative of the first portion by encoding the first portion at the first bit rate, and determining whether to transmit the first video packet as the communication data with the sending controller based on at least one of a transmission rate threshold, a transmission interval threshold, or a buffer fill threshold.

16 Claims, 5 Drawing Sheets

(56) References Cited

U.S. PATENT DOCUMENTS

| | | | | |
|---|---|---|---|---|
| 6,961,029 B1* | 11/2005 | Canova, Jr. | ............ | G02F 1/1362 345/55 |
| 6,987,778 B2* | 1/2006 | Sindhushayana | ..... | H04L 1/0003 370/468 |
| 7,953,062 B2* | 5/2011 | Sindhushayana | ..... | H04L 1/0003 370/345 |
| 8,265,171 B2* | 9/2012 | Steinbach | ............ | H04N 19/176 375/240.27 |
| 8,873,534 B2* | 10/2014 | Sindhushayana | ..... | H04L 1/0003 370/345 |
| 9,166,918 B1* | 10/2015 | Frink | ...................... | H04L 47/25 |
| 9,419,751 B2* | 8/2016 | Sindhushayana | ..... | H04L 1/0003 |
| 2003/0053435 A1* | 3/2003 | Sindhushayana | ..... | H04L 1/0003 370/342 |
| 2003/0152032 A1* | 8/2003 | Yanagihara | .... | H04N 21/234354 370/236.1 |
| 2005/0147033 A1* | 7/2005 | Chin | .................. | H04N 21/2343 370/229 |
| 2005/0226156 A1* | 10/2005 | Keating | .................. | H04L 47/10 370/235 |
| 2005/0232290 A1* | 10/2005 | Mathew | ........... | H04N 21/23406 370/412 |
| 2006/0114836 A1* | 6/2006 | Pollin | ....................... | H04L 1/24 370/252 |
| 2006/0274747 A1* | 12/2006 | Duchscher | ............ | H04L 1/0057 370/389 |
| 2007/0101378 A1* | 5/2007 | Jacobs | .............. | H04L 29/06027 725/90 |
| 2008/0101461 A1* | 5/2008 | Person | .................... | H03M 7/30 375/240.02 |
| 2008/0239075 A1* | 10/2008 | Mehrotra | ............... | H04N 7/181 348/143 |
| 2009/0036062 A1* | 2/2009 | Tanaka | .................. | H04L 1/0003 455/69 |
| 2009/0213940 A1* | 8/2009 | Steinbach | ............ | H04N 19/176 375/240.27 |
| 2011/0026418 A1* | 2/2011 | Bollea | ................. | H01Q 1/2258 370/252 |
| 2011/0080950 A1* | 4/2011 | Toyota | ............. | H04N 21/23805 375/240.12 |
| 2011/0268176 A1* | 11/2011 | Jeong | .................... | H04L 1/0001 375/240.01 |
| 2012/0001930 A1* | 1/2012 | Iwaki | ....................... | G06T 1/20 345/547 |
| 2012/0033090 A1* | 2/2012 | Kogure | ............. | H04N 5/23206 348/207.1 |
| 2012/0079329 A1* | 3/2012 | Steinbach | ............ | H04N 19/176 714/704 |
| 2012/0198315 A1* | 8/2012 | Soliman | ................ | H04L 1/0009 714/786 |
| 2013/0039411 A1* | 2/2013 | Aoki | ...................... | H04N 19/61 375/240.03 |
| 2013/0070860 A1* | 3/2013 | Schramm | .............. | H04J 3/0682 375/240.25 |
| 2014/0177464 A1* | 6/2014 | Kanamarlapudi | .... | H04L 1/1848 370/252 |
| 2014/0241249 A1* | 8/2014 | Sindhushayana | ..... | H04L 1/0003 370/328 |
| 2015/0110103 A1* | 4/2015 | Kullangal Sridhara | ...................... | H04L 47/6255 370/352 |
| 2015/0358980 A1* | 12/2015 | Hara | ..................... | H04W 48/16 370/329 |
| 2015/0382348 A1* | 12/2015 | Hara | ................. | H04W 72/0453 370/329 |
| 2016/0294506 A1* | 10/2016 | Sindhushayana | ..... | H04L 1/0003 |
| 2016/0302091 A1* | 10/2016 | Park | ...................... | H04W 48/16 |
| 2017/0026819 A1* | 1/2017 | Xue | ...................... | H04W 8/005 |
| 2017/0033893 A1* | 2/2017 | Kang | .................... | H04L 1/0051 |
| 2017/0273135 A1* | 9/2017 | Siomina | ............. | H04W 76/048 |

OTHER PUBLICATIONS

Hu et al., "Energy-Aware Video Streaming on Smartphones," 2015 IEEE Conference on Computer Communications (INFOCOM), pp. 1185-1193.

Wu et al., "Energy-Minimized Multipath Video Transport to Mobile Devices in Heterogeneous Wireless Networks," IEEE Journal on Selected Areas in Communications, vol. 34, No. 5, May 2016, pp. 1160-1178.

Marković et al., "Methods for True Energy-Performance Optimization," IEEE Journal of Solid-State Circuits, vol. 39, No. 8, Aug. 2004, pp. 1282-1293.

Carroll et al., "An Analysis of Power Consumption in a Smartphone," Proceedings of USENIX ATC, 2010, 14 pages.

Liu et al., "A Novel Rate Control Scheme for Low Delay Video Communication of H.264/AVC Standard," IEEE Transactions on Circuits and Systems for Video Technology, vol. 17, No. 1, Jan. 2007, pp. 68-78.

Nunes et al., "Joint Rate Control Algorithm for Low-Delay MPEG-4 Object-Based Video Encoding," IEEE Transactions on Circuits and Systems for Video Technology, vol. 19, No. 9, Sep. 2009, pp. 1274-1288.

* cited by examiner

EMBEDDED MULTIMEDIA SYSTEMS WITH ADAPTIVE RATE CONTROL FOR POWER EFFICIENT VIDEO STREAMING

TECHNICAL FIELD

This disclosure relates generally to video transmission systems, and in particular but not exclusively, relates to embedded multimedia systems with adaptive bit rate control for power efficient video streaming.

BACKGROUND INFORMATION

Real-time video transmission over unreliable communication networks may incur various image quality problems, e.g., missing or distorted frames, freezing, stalls, interruptions, etc. These issues may be caused by bandwidth fluctuations, inadequate bandwidth, packet losses, and/or sender-side or receiver-side buffer underflow/overflow. Other issues that may hinder the transmission of the video include delay constraint, reliability requirements, throughput demand, network dynamics, etc. For example, if the instantaneous transmission rate of a sending device is larger than the available network bandwidth, many packets may arrive at the destination out of a deadline, which may induce image quality degradation.

BRIEF DESCRIPTION OF THE DRAWINGS

Non-limiting and non-exhaustive examples of the invention are described with reference to the following figures, wherein like reference numerals refer to like parts throughout the various views unless otherwise specified.

Figure 1:
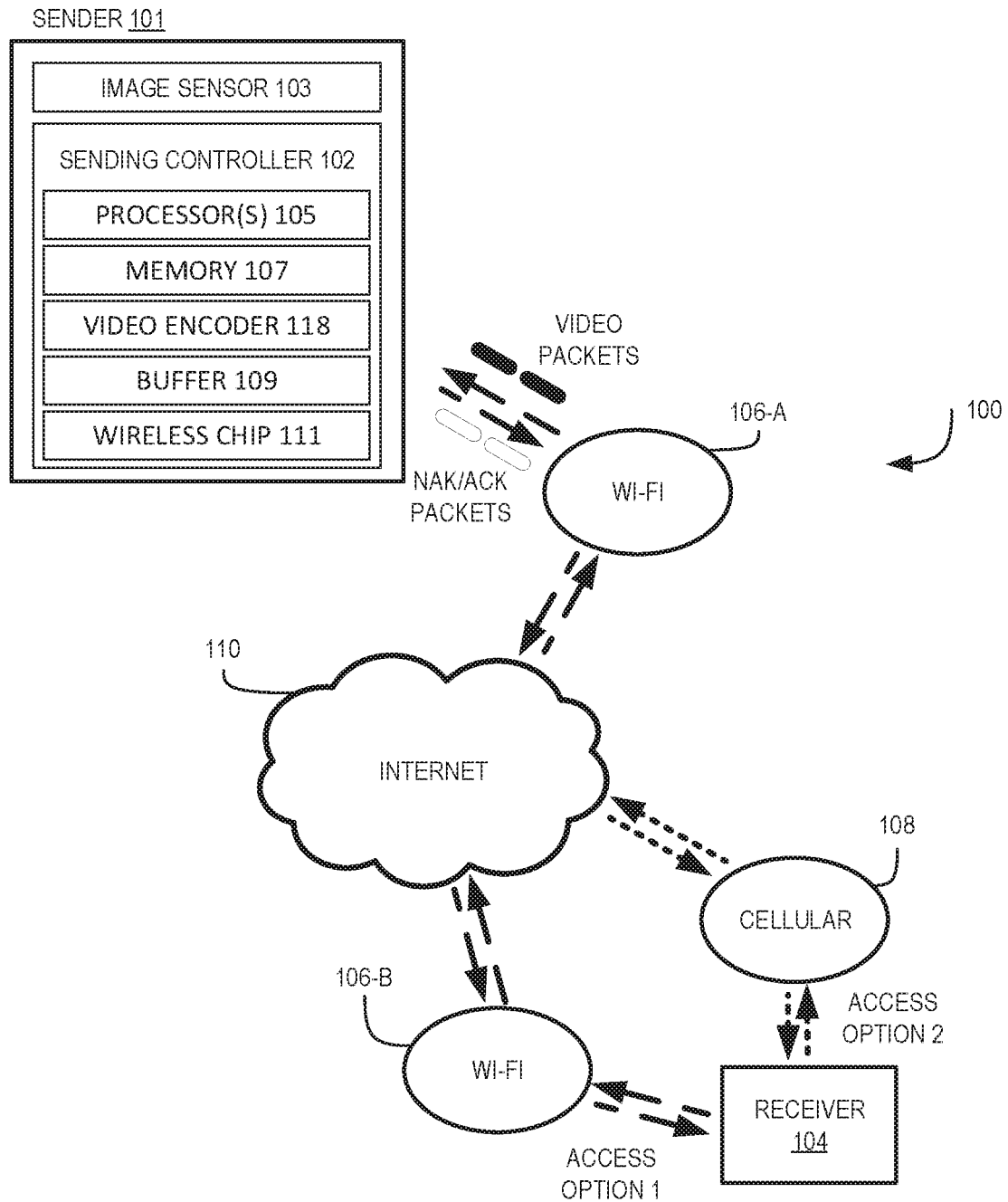
FIG. 1 is an example embedded multimedia system for video streaming power-efficiently with adaptive rate control in accordance with an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of a system and method for a real-time video transmission system that enables power efficient video streaming with adaptive rate control are described herein. In the following description, numerous specific details are set forth to provide a thorough understanding of the examples. One skilled in the relevant art will recognize; however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

FIG. 1 is an example video transmission system 100 in accordance with an embodiment of the present disclosure. The video transmission system 100 (system 100 for short) includes a sender 101, a receiver 104, two or more Wi-Fi points 106, a cellular network point 108, and internet 110. As illustrated, the sender 101 and the receiver 104 are communicatively coupled to each other via a wired (e.g., Ethernet) or wireless (e.g., Wi-Fi, Bluetooth, LTE, HSDPA, and the like) communication standard. The system 100 may provide for real-time video streaming from the sender 101 to the receiver 104 with a limited delay constraint. For example, a duration between when the sender 101 records or captures the video and the receiver 104 receives the video may be less than 300 ms. The sender 101 includes an image sensor 103 and a sending controller 102. The sending controller 102 includes one or more processors 105, memory 107, a video encoder 118, a buffer 109, and a wireless chip 111.

The image sensor 103 generates video data (e.g., when capturing or recording videos) at a source bit rate. The source bit rate may correspond to a bit rate of uncoded or uncompressed video data, which is dependent on a resolution and a frame rate of the video data generated by the image sensor 103. The source bit rate may be based on pre-determined values for a frame rate, a resolution, and/or a color depth of the video data. In some embodiments, the pre-determined values may be initial or default values for the image sensor 103. In other embodiments, the pre-determined values may be based on an input from a user of the system 100 (e.g., the user of the receiver 104). For example, the image sensor 103 may generate video data having 8-bit color depth with a 1280 pixels by 720 pixels (e.g., 720p) resolution at 25 frames per second (fps), which may have a corresponding source bit rate at approximately 5 megabits per second (Mbps). Furthermore, it is appreciated that the source bit rate of 5 MB/s is merely an example, and that the source bit rate may be determined, at least in part, by the hardware capabilities of the image sensor 103 in combination with other factors (e.g., a pre-determined or user defined value of resolution, color depth, and/or frame rate for generating the video data). The sending controller 102 is coupled to the image sensor 103 to transmit communication data representative of the video data (e.g., for real-time video streaming of the video data). However, real-time video streaming of the video data at the source bit rate of the image sensor 103 may require an amount of bandwidth greater than the bandwidth that is available between the sender 101 and the receiver 104. Additionally, it may be power inefficient to stream the video data from the sender 101 to the receiver 104 at the source bit rate.

The system 100 may implement an adaptive rate control to achieve power-efficient video streaming. In some embodiments, the system 100 may adjust a bit rate of the video data (e.g., by encoding at least a portion of the video data at a first bit rate different from the source bit rate with the video encoder 118) and a power of the wireless chip 111 to achieve the power-efficient video streaming. Additionally, the system 100 may determine whether or not to send a packet (e.g., video packets representative of portions of the video data) from the sender 101 to the receiver 104 based on at least one of a transmission rate threshold, a transmission interval threshold, or a buffer fill threshold of sender 101. The adaptive rate control may adjust a bit rate for each of the video packets based on various video and network parameters. Each of the video packets may correspond to a group of pictures (GoP) for video streaming. Each GoP have a number of image frames. The number of image frames arranged in a specific sequence which may include I-frames (intra-coded picture), P-frames (predicted picture), and/or B-frames (bidirectional predicted picture) types of image frames that represent a respective portion of the video data. The amount the bit rate of each packet is adjusted may be based, at least in part, on a previous bit rate of a most recently stored video packet included in a video packet buffer (e.g., the buffer 109). The video parameters may include a current bit rate, a frame rate, a frame size, a color depth, a resolution, and a packet size, among others. The network parameters may at least include a travel time, or otherwise known as a propagation delay, (e.g., a duration for a video packet to travel from the sender 101 to the receiver 104), a round trip time (e.g., a duration for data to travel from the sender 101 to the receiver 104 and then back to the sender 101), a packet loss rate (e.g., a number or percentage of video packets lost that were sent to the receiver 104 but were not acknowledged as being received) of the system 100, and an estimated bandwidth (e.g., an estimate of bandwidth available between the sender 101 and the receiver 104). The travel time and the round trip time may be estimated, for example, based on timestamps for sending the video packet and a subsequent acknowledgement received indicating that the same video packet was received. The system 100, for example, may be implemented by applications that provide real-time video, such as point-to-point systems that provide video from a remote camera to a viewer via a wireless and/or wired communication system. The communication system may include the internet, wi-fi, and/or cellular transmission media.

The illustrated embodiment of system 100 includes the sender 101, the receiver 104, two or more Wi-Fi points 106, a cellular network point 108, and internet 110. The sender 101 may transmit communication data (e.g., video packets representative of portions of the video data) to the receiver 104. The video packets may propagate through various paths from the sender 101 to the receiver 104. For example, the video packets may first be provided to the Wi-Fi point 106-A before propagating to and through the internet 110. As the video packets exit the internet 110 on their way to the receiver 104, the video packets may go through the Wi-Fi point 106-B or the cellular network (e.g., LTE, HSDPA, 3G, etc.) point 108. In some embodiments, the cellular network point 108 is 4G LTE based protocol. In response to the video packets, the receiver 104 may transmit an acknowledgement (ACK) packet and/or negative acknowledgement (NAK) packet to the sender 101 to indicate whether the video packet was or was not received.

In some embodiments, the sender 101 may have limited power, e.g., powered by a battery, and the power consumption of the transmission of the video packets may be a limiting factor to the robustness of the system. For example, video encoding (e.g., with the video encoder 118) and data communication (e.g., with the wireless chip 111) may constitute a main portion of the power consumption of the sender 101. To improve the efficiency of the power usage, the sender 101 may optimize the bit rate of each one of the video packets and the transmission power level used to wirelessly transmit the video packets. For example, the sender 101 may increase or decrease the bit rate (e.g., to a first bit rate different from the source bit rate) at which the video encoder 118 generates a particular one of the video packets based on the available video and network parameters discussed above and a previous bit rate of a most recently stored video packet included (e.g., stored) in the video packet buffer (e.g., the buffer 109). Additionally, the sender 101 may determine whether one of the video packets should be transmitted at a particular time based on the various network and buffer parameters. Furthermore, the sender 101 may adjust a level of power of the wireless chip 111, based on a received signal strength index (RSSI) value for the adjusted bit rate (e.g., the first bit rate). For example, if the RSSI is low, then the transmission power of the wireless chip 111 may be increased. Similarly, a high RSSI value may result in decreasing the transmission power of the wireless chip 111.

Figure 2:
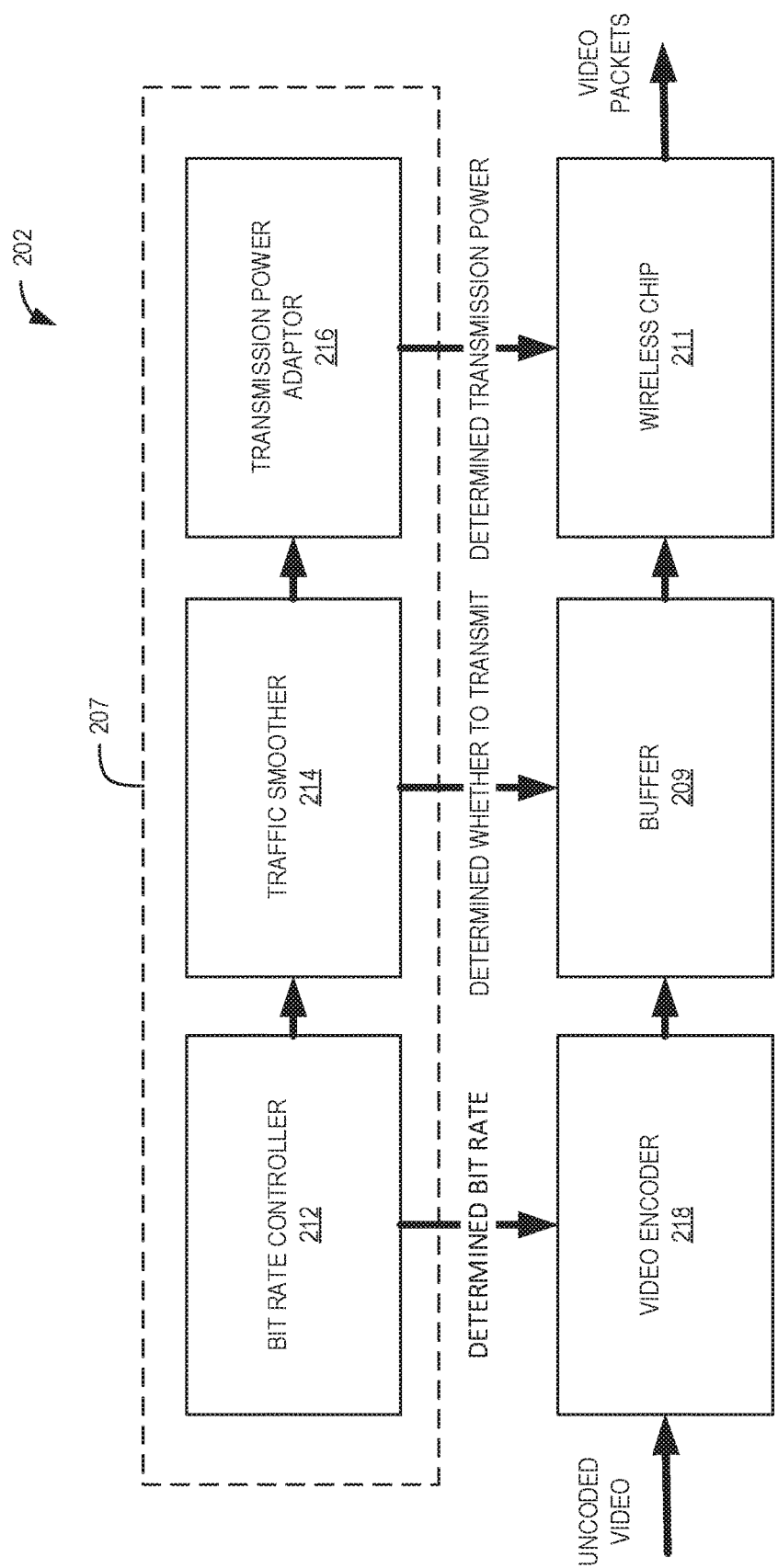
FIG. 2 is an example illustration of a sending controller in accordance with an embodiment of the present disclosure.

FIG. 2 is an example illustration of a sending controller 202 in accordance with an embodiment of the present disclosure. The sending controller 202 is one possible implementation of the sending controller 102 of the sender 101 illustrated in FIG. 1. As illustrated in FIG. 2, the sending controller 202 may include hardware and software for implementing power-efficient video streaming with adaptive rate control. The sending controller 202 may include hardware components, such as video encoder 218, buffer 209, and wireless chip 211. The sending controller 202 may also include firmware 207 (e.g., instructions stored on memory coupled to one or more processors included in sending controller 202), such as bit rate controller 212, traffic smoother 214, and transmission power adaptor 216. The firmware blocks may control a respective one of the hardware components in implementing the power-efficient video streaming with adaptive rate control. Similarly, each firmware block may be responsible for determining specific parameters, actions, or operations of the sending controller 202.

The sending controller 202 may receive video data at a source bit rate (e.g., uncoded or uncompressed video data) generated by an image sensor (e.g., the image sensor 103 of FIG. 1), and wirelessly transmit video packets representative of the video data in response. The video data may be received by the video encoder 218, which encodes the video data from the source bit rate to a different bit rate, as provided by the bit rate controller 212. For example, bit rate controller 212 may determine a first bit rate to encode a first portion of the video data. The video encoder 218 may then generate a first video packet representative of the first portion of the video data by encoding the first portion at the first bit rate. The output of the video encoder 218 (e.g., video packets such as the first video packet), is provided to the buffer 209. The buffer 209 temporarily stores the video packets. For example, the buffer 209 may be a retransmission buffer for ACK/NAK protocols. The sending controller 202 may remove individual video packets from the buffer 209 once an acknowledgement of receipt is received (e.g., receiver 104 sends an ACK response to sender 101 in response to receiving the video packets, as illustrated in FIG. 1).

As illustrated, in response to video encoder 218 generating the video packets (e.g., the first video packet), traffic smoother 214 determines whether to transmit each of the video packets (e.g., the first video packet) as the communication data with the sending controller 202 based on at least one of a transmission rate threshold (e.g., less than 2 Mbps), a transmission interval threshold (e.g., larger than 5 ms), or a buffer fill threshold (e.g., a number of the video packets within buffer 209 is less than 80% of a maximum video packet size/capacity of the buffer 209). In some embodiments, traffic smoother 214 determines whether the video packets are to be transmitted based on all of the threshold conditions (e.g., the transmission rate threshold, the transmission interval threshold, and the buffer fill threshold criteria must be met in order for the video packets to be transmitted). Upon determining to send the video packets (e.g., the first video packet), the traffic smoother 214 prompts the packet buffer 209 to provide the video packets to the wireless chip 222. The traffic smoother 214, effectively determines a transmission interval of the sending controller 202 by determining whether or not to send the video packets. A transmission interval control signal provided by the traffic smoother 214 causes the buffer 209 to send the video packets (e.g., the first video packet) to the wireless chip 211 to transmit the video packets as the communication data. The communication data may be transmitted as transmission packets. Depending on a transmission packet size of the transmission packets, the transmission packet may include a portion of one of the video packets, an individual one of the video packets, or more than one of the video packets. Each of the transmission packets may be packaged with a header, which may be dependent on the transport protocol (e.g., IPv4, IPv6, and the like) utilized. Additional information may further be included in the header of the transmission packets such as specific information regarding the bit rate, frame rate, color depth, as well as ordering information of individual frames included in the video packets. Furthermore, sending controller 202 may record a time stamp in response to sending the video packets (e.g., the first video packet) so the ACK/NAK protocols may be implemented (e.g., by sender 101 of FIG. 1). Lastly, the wireless chip 211 transmits the video packets (e.g., the first video packet) at a power level in accordance with a transmission power value determined by the transmission power adaptor 216.

The bit rate controller 212 additionally provides some parameters to the traffic smoother 214, which may be utilized to determine whether to transmit the video packets (e.g., the transmission interval). For example, the bit rate controller 212 may provide the traffic smoother 214 the bit rate of each of the video packets (e.g., the first bit rate of the first video packet). In turn, the traffic smoother 214 provides the bit rate to the transmission power adaptor 216 for use in determining the transmission power value. Accordingly, each of the video packets may have different bit rates and subsequently may be transmitted at different transmission power values by sending controller 202 to adjust for network and video parameters and to improve the power efficiency of the video transmission.

Figure 3:
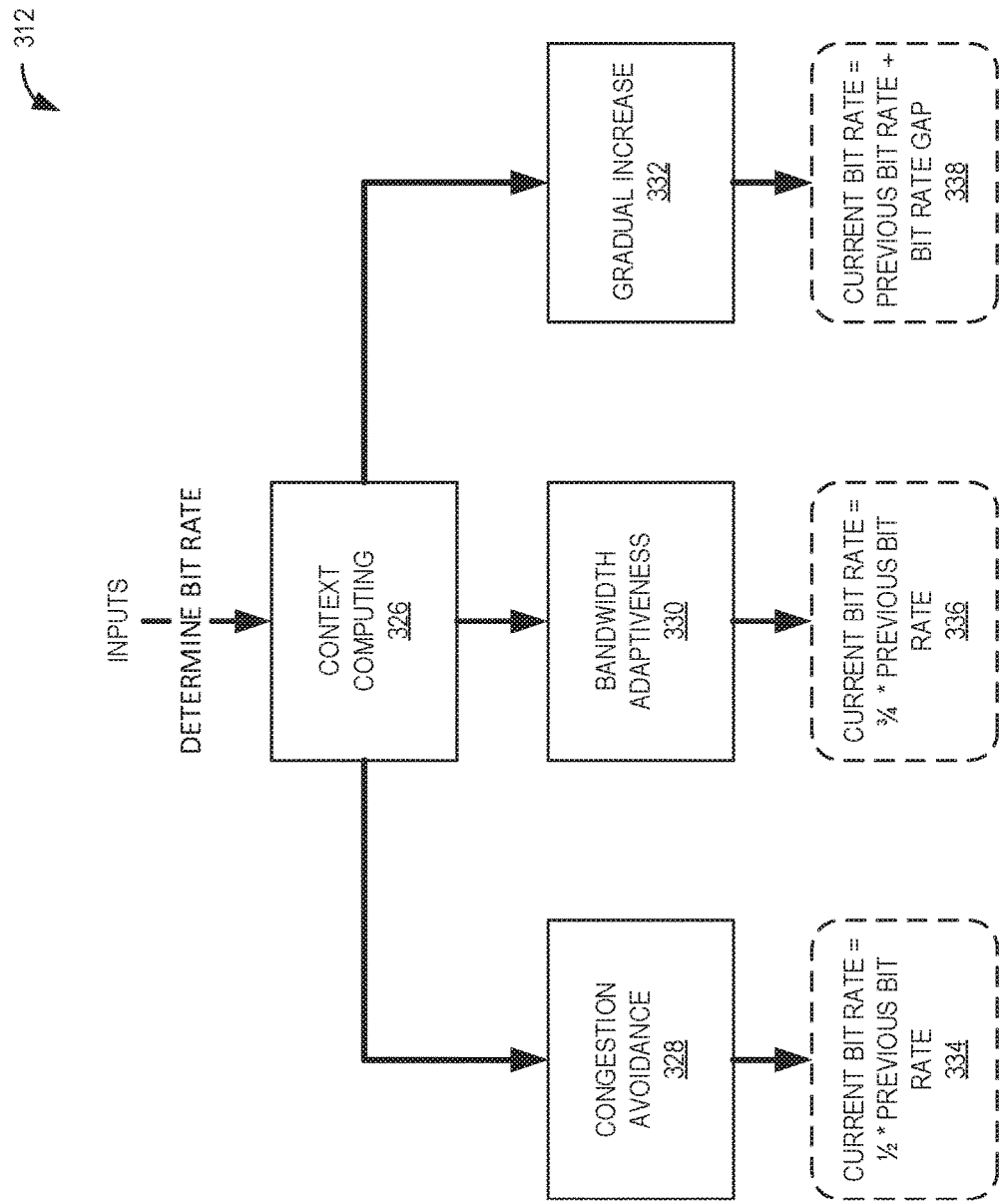
FIG. 3 is an example bit rate controller in accordance with an embodiment of the present disclosure.

FIG. 3 is an example bit rate controller 312 in accordance with an embodiment of the present disclosure. The bit rate controller 312 is one possible implementation of the bit rate controller 212 illustrated in FIG. 2. Referring back to FIG. 3, the bit rate controller 312 includes a context computing block 326, a congestion avoidance block 328, a bandwidth adaptiveness block 330, and a gradual increase block 332 to determine bit rates for encoding portions (e.g., I-frames, P-frames, or B-frames) of video data received at a source bit rate (e.g., uncoded or uncompressed video data received from the image sensor 103 of sender 101 in FIG. 1). The portions of the video data are provided to and encoded by a software or hardware video encoder (e.g., video encoder 218 of FIG. 2) to generate video packets. The bit rate controller 312 determines the bit rates based on various inputs (e.g., video and network parameters such as a previous bit rate of a most recently stored video packet included in a video packet buffer, a number of consecutive video packets lost, a travel time, a buffer fill ratio of the video packet buffer, a video packet loss rate, a frame rate, a frame size, a resolution, a color bit depth, a packet size, and the like). In some embodiments, certain parameters may be pre-configured by an end user (e.g., the frame rate, frame size, and packet size). The bit rates may be provided to the video encoder for encoding. The bit rate controller 312 may be implemented as firmware running on one or more video codecs (e.g., MPEG, H.264, H. 265, WMV, VP6, and the like). In some embodiments, the bit rate controller 212 may adjust or update the bit rate dependent on the delay constraint. For example, if the delay constraint is 150 ms the bit rate is updated at least every 0.5 seconds. Similarly, if the delay constraint is 300 ms the bit rate is updated at least every 300 ms.

In some embodiments, the bit rate controller 312 determines a first bit rate to encode a first portion of the video data for generating a first video packet. The video data may be received from the image sensor (e.g., image sensor 103 of FIG. 1) at the source bit rate (e.g., uncoded or uncompressed bit rate). The first bit rate being different than the source bit rate. The bit rate controller 312 may determine the first bit rate based, at least in part, on the previous bit rate of the most recently stored video packet included in the video packet buffer (e.g., the buffer 209 of FIG. 2). For example, each time one of the video packets is generated, the generated video packet is stored in the video packet buffer. Thus, the most recently stored video packet is a previous one of the video packets generated and stored in the video packet buffer before the first bit rate of the first video packet is determined. More specifically, the most recently stored video packet was generated before and closest in time to the first video packet than any other previously generated video packets.

The context computing block 326 may receive the network and video parameters, and determine which bit rate control block to use for determining the bit rate (e.g., the first bit rate of the first video packet) for encoding the video packets. For example, based on the network and video parameters, the context computing block determines which one of the congestion avoidance block 328, the bandwidth adaptiveness block 330, or the gradual increase block 332 is utilized to determine the bit rate for a corresponding one of the video packets. As illustrated, the bit rate (e.g., the current bit rate) is based, at least in part, on the previous bit rate of the most recently stored video packet included in the video packet buffer. The conditions for determining the bit rate based on the congestion avoidance block 328, bandwidth adaptiveness block 330, and gradual increase block 332, are carefully selected such that there is no overlap in conditions, such that only one of the three blocks (328, 330, and 332) is utilized for determining the bit rate for a GoP included in the video packets.. Thus, for example, there will not be a situation in which the bit rate is determined by both bandwidth adaptiveness block 330 and gradual increase block 332.

The congestion avoidance block 328 determines the bit rate based on the number of consecutive video packets lost and a travel time of a most recently transmitted video packet. For example, congestion avoidance block 328 determines whether the number of consecutive video packets lost is equivalent to a first threshold. The congestion avoidance block 328 may then also determine whether the travel time of the most recently transmitted video packet is greater than or equal to a second threshold. Then, based on the number of consecutive video packets lost being equivalent to the first threshold and the travel time being greater than or equal to the second threshold, the congestion avoidance block 328 determines the bit rate (e.g., the first bit rate of the first video packet) is less than the previous bit rate (e.g., of the most recently stored video packet included in the video packet buffer). More specifically, the congestion avoidance block 328 may determine that the bit rate is half the previous bit rate. Reducing the bit rate to half the previous bit rate may mitigate network congestion and burst packet losses. Furthermore, reducing the bit rate results in a lower video quality. The number of consecutive video packets lost may correspond to consecutive video packets previously transmitted (e.g., by the sender 101 to the receiver 104, as illustrated in FIG. 1) that were not acknowledged (e.g., the sender 101 of FIG. 1 did not receive an ACK response or received a NAK response after transmitting the video packets) indicating the number of consecutive video packets were lost. The travel time of the most recently transmitted video packet may correspond to the time between sending and receiving the video packet (e.g., the duration of a one way trip between the sender 101 and the receiver 104 as illustrated in FIG. 1).

In some embodiments, the first threshold corresponds to one video packet lost and the second threshold corresponds to an average delivery time of previously transmitted video packets minus a standard of deviation of the average delivery time. The delivery time corresponding to the duration it takes for one video packet to travel from a sender (e.g., the sender 101 of FIG. 1) to a receiver (e.g., the receiver 104 of FIG. 1). In other embodiments, the first threshold corresponds to two consecutive video packets lost and the second threshold corresponds to the average delivery time of the previously transmitted video packets minus the standard of deviation of the average delivery time divided by two. In yet other embodiments, the first threshold corresponds to three consecutive video packets lost and the second threshold corresponds to the average delivery time of the previously transmitted video packets. In other embodiments, the first threshold corresponds to four or more consecutive video packets lost and the second threshold corresponds to the average delivery time of the previously transmitted video packets minus the standard of deviation of the average delivery time divided by two. While each of the described examples of the first threshold and the second threshold may be utilized individually, in some embodiments, the congestion avoidance block 328 may check to see if any one of the four conditions applies to the video packet being generated. In other words, context computing 326 may determine that congestion avoidance 328 should not be used if none of the four conditions (e.g., described previously for the first threshold and the second threshold) applies to the video packet being generated.

The bandwidth adaptiveness block 330 determines the bit rate based on a buffer fill ratio of the video packet buffer (e.g., of buffer 209 of FIG. 2) or the video packet loss rate (e.g., of video packets transmitted by sender 101 of FIG. 1). The bandwidth adaptiveness block 330 may determine whether the buffer fill ratio of the video packet buffer is above a buffer fill threshold and determine whether the video packet loss rate is above a packet loss threshold. Then based on the buffer fill ratio being above the buffer fill threshold or the video packet loss rate being above the packet loss threshold, determining the bit rate (e.g., the first bit rate of the first video packet) of the corresponding video packet to be generated is less than the previous bit rate. More specifically, the bandwidth adaptiveness block 330 may determine the bit rate (e.g., the first bit rate) is three-fourths of the previous bit rate. In some embodiments, the buffer fill ratio is defined as the number of buffered video packets divided by the total or maximum buffer size. The buffer fill threshold then may be forty percent or four tenths. In the same or other embodiments, the video packet loss rate may be a percentage of video packets lost that were transmitted. The packet loss threshold may correspond to five percent or five hundredths.

The gradual increase block 332 determines the bit rate based on the buffer fill ratio of the video packet buffer (e.g., of buffer 209 of FIG. 2) or the video packet loss rate (e.g., of video packets transmitted by sender 101 of FIG. 1). The gradual increase block 332 is different, in at least one regard, to the bandwidth adaptiveness block 320 as the outcome of the gradual increase block 332 is to determine the bit rate (e.g., the first bit rate of the first video packet) of the corresponding video packet to be generated is greater than the previous bit rate. The gradual increase block 332 may determine whether the buffer fill ratio of the video packet buffer is below the buffer fill threshold and determine whether the video packet loss rate is below the packet loss threshold. Then based on the buffer fill ratio being below the buffer fill threshold and the video packet loss rate being below the packet loss threshold, determining the bit rate (e.g., the first bit rate of the first video packet) of the corresponding video packet to be generated is greater than the previous bit rate. More specifically, the gradual increase block 332 may determine the bit rate (e.g., the first bit rate) is equal to the previous bit rate plus a bit rate gap. The bit rate gap may be a fixed adjustment step (e.g., 5 Kbps) determined based on the hardware capabilities of the system. In some embodiments, the buffer fill threshold may correspond to ten percent or one tenth. In the same or other embodiments, the video packet loss rate may correspond to two percent or two hundredths.

It is further appreciated that the buffer fill threshold and the packet loss threshold may correspond to the same or different values for the bandwidth adaptiveness block 330 and the gradual increase block 332. For example, the bandwidth adaptiveness block 330 may having a corresponding buffer fill threshold of four tenths while the corresponding buffer fill threshold of the gradual increase block 332 may be one tenth. Similarly, the packet loss threshold of the bandwidth adaptiveness block 330 may be five hundredths while the corresponding packet loss threshold of the gradual increase block 332 may be two hundredths.

Figure 4:
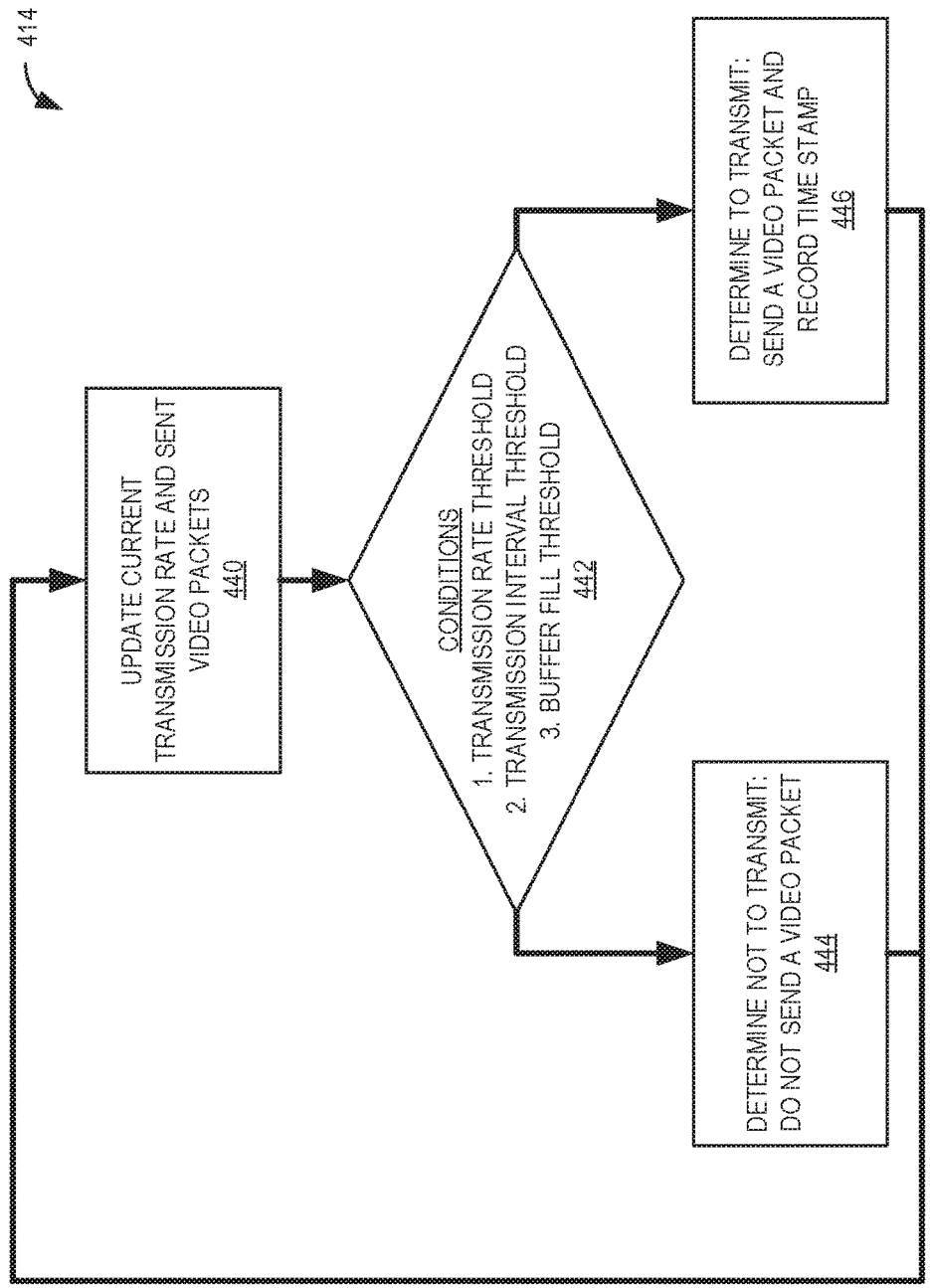
FIG. 4 is an example traffic smoother in accordance with an embodiment of the present disclosure.

FIG. 4 is an example traffic smoother 414 in accordance with an embodiment of the present disclosure. The traffic smoother 414 is one possible implementation of the traffic smoother 214 illustrated in FIG. 2. Referring back to FIG. 4, the traffic smoother 414 is an iterative loop (e.g., while loop) that determines whether or not to transmit a recently generated video packet. The loop of the traffic smoother 414 may be executed every five or six milliseconds. Block 440 obtains updated parameters (e.g., the most recent) for current transmission rate and sent video packets based on the video packets previously generated and/or transmitted. The current transmission rate represents a total amount of data traffic transmitted per second, including any header for the video packets. Block 442 then compares the updated parameters to threshold conditions. Then based on the comparison, traffic smoother 414 determines not to transmit (e.g., block 444) or to transmit (e.g., block 446) the video packet (e.g., the first video packet).

In one example, the block 442 determines whether the current transmission rate (e.g., of the sending controller 102 illustrated in FIG. 1) is below a transmission rate threshold (e.g., 2 Mbps). The block 442 also determines whether the buffer fill ratio of the video packet buffer (e.g., the buffer 209 illustrated in FIG. 2) is below the buffer fill threshold (e.g., eighty percent). Additionally, the block 442 determines whether transmitting the video packet (e.g., the first video packet) results in a transmission interval above the transmission interval threshold (e.g., larger than 5 ms). More specifically, the transmission interval refers to a duration between transmitting consecutive video packets (e.g., the time between transmitted the first video packet and the most recently transmitted video packet). In other embodiments, the transmission interval refers to two consecutive video packets most recently transmitted by the sending controller (e.g., sending controller 102 illustrated in FIG. 1). Then based on the transmission rate being below the transmission threshold, the transmission interval being above the transmission interval threshold, and the buffer fill ratio being below the buffer threshold, transmitting the video packet (e.g., the first video packet). Block 446 then determines to transmit and sends the video packet (e.g., the first video packet) with the sending controller (e.g., with the wireless chip 111 of the sending controller 102 illustrated in FIG. 1). Upon transmitting or sending the video packet, the system (e.g., system 100 illustrated in FIG. 1) records a timestamp (e.g., a first timestamp corresponding to transmitting the first video packet). The timestamp indicates when the video packet was transmitted by the sending controller and may be utilized in ACK/NAK mechanisms, for example.

Figure 5:
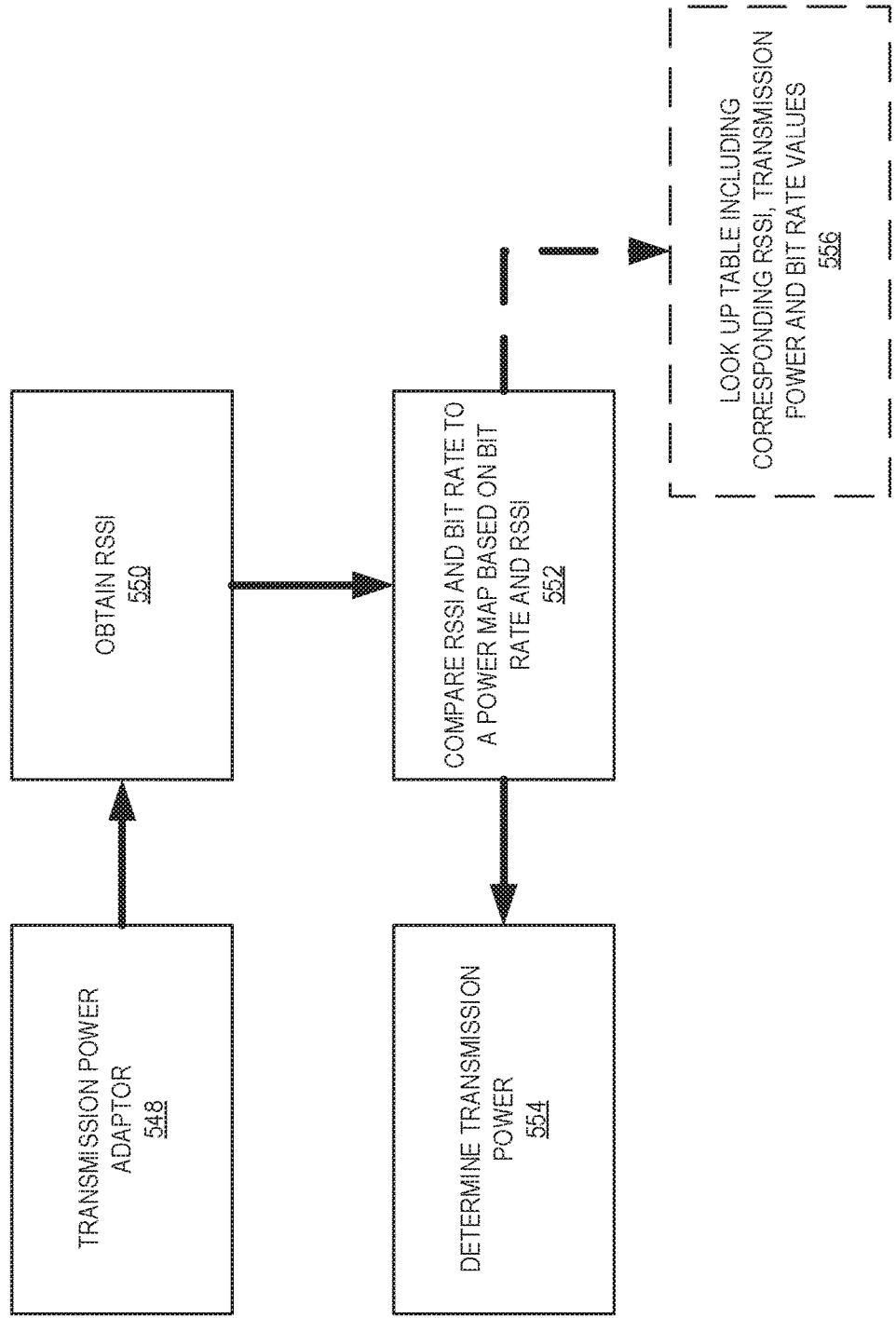
FIG. 5 is an example transmission power adapter scheme in accordance with an embodiment of the present disclosure.

FIG. 5 is an example transmission power adapter scheme 516 in accordance with an embodiment of the present disclosure. The transmission power adapter scheme 516 is one possible implementation of the transmission power adapter 216 illustrated in FIG. 2. Referring back to FIG. 5, the transmission power adapter scheme 516 is a scheme that determines transmission power (e.g. of the wireless chip 111 illustrated in FIG. 1) for transmitting video packets.

In particular, the transmission power adapter 548 first obtains a received signal strength index (RSSI) of the sending controller (e.g., the sending controller 102 illustrated in FIG. 1) via block 550. The RSSI is received signal strength index, in arbitrary units, in a wireless environment determined by the transmission distance to the access point. For example the RSSI may be an indicator of signal strength in a wireless connection between different devices (e.g., between sender 101 and access point 106-A, as illustrated in FIG. 1). Then, via block 552, the transmission power adapter 548 determines whether the RSSI of the sending controller is within an RSSI threshold range. Additionally, via block 552, the transmission power adapter 548 determines whether the bit rate (e.g., the first bit rate of the first video packet) is within a bit rate threshold range. Transmission power adapter 548, via block 554, then determines the transmission power for transmitting the video packet. In some embodiments, the transmission power adapter scheme 516 includes a look up table 556 stored in memory (e.g., the memory 107 illustrated in FIG. 1) for determining the transmission power (e.g., a first transmission power for transmitting the first video packet). The look up table 556 includes transmission power values for each corresponding RSSI and bit rate values. In other words, the look up table provides a rule set to determine the transmission power based on the RSSI and bit rate specific to the system. Then based on the RSSI being within the RSSI threshold range and the bit rate (e.g., the first bit rate) being within the bit rate threshold range, determining the transmission power (e.g., the first transmission power for transmitting the first video packet). For example, if the RSSI is −31 and the bit rate is 1.5 Mbps then the transmission power may be 16. Thus, the transmission power adapter scheme 516 is an adaptive power control scheme for adjusting the transmission power of the sending controller to lower the overall power requirements of the system.

The processes explained above are described in terms of computer software and hardware. The techniques described may constitute machine-executable instructions embodied within a tangible or non-transitory machine (e.g., computer) readable storage medium, that when executed by a machine (e.g., sender 101 or sending controller 102 of FIG. 1) will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A system comprising:
    an image sensor to generate video data at a source bit rate; and
    a sending controller coupled to the image sensor to transmit communication data representative of the video data, wherein the sending controller includes one or more processors coupled to memory, the memory including instructions, which when executed by the sending controller causes the system to perform operations including:
        determining a first bit rate to encode a first portion of the video data, wherein the first bit rate is different than the source bit rate;

generating a first video packet representative of the first portion by encoding the first portion at the first bit rate, wherein the first video packet is stored in a video packet buffer included in the sending controller, and wherein the first bit rate of the first video packet is based, at least in part, on a previous bit rate of a most recently stored video packet included in the video packet buffer of the sending controller;

determining, in response to generating the first video packet, whether to transmit the first video packet as the communication data with the sending controller based on at least one of a transmission rate threshold, a transmission interval threshold, or a buffer fill threshold;

determining a received signal strength index (RSSI) of the sending controller is within a RSSI threshold range;

determining the first bit rate of the first video packet is within a bit rate threshold range; and based on the RSSI being within the RSSI threshold range and the first bit rate being within the bit rate threshold range, determining a first transmission power by selecting the first transmission power from a look up table stored in the memory.

2. The system of claim 1, wherein the memory includes additional instructions, which when executed by the sending controller causes the system to perform further operations including:

determining whether a number of consecutive video packets lost is equivalent to a first threshold;

determining whether a travel time of a most recently transmitted video packet is greater than or equal to a second threshold; and based on the number of consecutive video packet lost being equivalent to the first threshold and the travel time being greater than or equal to the second threshold, determining the first bit rate is less than the previous bit rate.

3. The system of claim 1, wherein the memory includes additional instructions, which when executed by the sending controller causes the system to perform further operations including:

determining whether a buffer fill ratio of the video packet buffer is above the buffer fill threshold; and based on the buffer fill ratio being above the buffer fill threshold, determining the first bit rate is less than the previous bit rate.

4. The system of claim 1, wherein the memory includes additional instructions, which when executed by the sending controller causes the system to perform further operations including:

determining whether a video packet loss rate is above a packet loss threshold; and based on the video packet loss rate being above the packet loss threshold, determining the first bit rate is less than the previous bit rate.

5. The system of claim 1, wherein the memory includes additional instructions, which when executed by the sending controller causes the system to perform further operations including:

determining whether a buffer fill ratio of the video packet buffer is below the buffer fill threshold;

determining whether a video packet loss rate is below a packet loss threshold; and based on the buffer fill ratio being below the buffer fill threshold and the video packet loss rate being below the packet loss threshold, determining the first bit rate is greater than the previous bit rate.

6. The system of claim 1, wherein the memory includes additional instructions, which when executed by the sending controller causes the system to perform further operations including:

determining whether a current transmission rate of the sending controller is below the transmission rate threshold;

determining whether a transmission interval between consecutive video packets is above the transmission interval threshold;

determining whether a buffer fill ratio of the video packet buffer is below the buffer fill threshold; and based on the transmission rate being below the transmission threshold, the transmission interval being above the transmission interval threshold, and the buffer fill ratio being below the buffer fill threshold, transmitting the first video packet.

7. The system of claim 6, wherein the memory includes additional instructions, which when executed by the sending controller causes the system to perform further operations including:

transmitting the first video packet with the sending controller at the first transmission power.

8. The system of claim 6, wherein the memory includes additional instructions, which when executed by the sending controller causes the system to perform further operations including:

recording a first timestamp to the memory, the first timestamp indicating when the first video packet was transmitted by the sending controller.

9. A method for video streaming, the method comprising:

receiving video data via a sending controller coupled to an image sensor adapted to generate the video data at a source bit rate, wherein the sending controller includes memory;

determining a first bit rate to encode a first portion of video data;

generating a first video packet representative of the first portion by encoding the first portion at the first bit rate, wherein the first video packet is stored in a video packet buffer, wherein the first bit rate of the first video packet is based, at least in part, on a previous bit rate of a most recently stored video packet included in the video packet buffer; and determining, in response to generating the first video packet, whether to transmit the first video packet based on at least one of a transmission rate threshold, a transmission interval threshold, or a buffer fill threshold;

determining a received signal strength index (RSSI) of the sending controller is within a RSSI threshold range;

determining the first bit rate of the first video packet is within a bit rate threshold range; and based on the RSSI being within the RSSI threshold range and the first bit rate being within the bit rate threshold range, determining a first transmission power by selecting the first transmission power from a look up table stored in the memory.

10. The method of claim 9, further comprising:

determining whether a number of consecutive video packets lost is equivalent to a first threshold;

determining whether a travel time of a most recently transmitted video packet is greater than or equal to a second threshold; and based on the number of consecutive video packet lost being equivalent to the first threshold and the travel time being greater than or equal to the second threshold, determining the first bit rate is less than the previous bit rate.

11. The method of claim 9, further comprising:
determining whether a buffer fill ratio of the video packet buffer is above the buffer fill threshold; and
based on the buffer fill ratio being above the buffer fill threshold, determining the first bit rate is less than the previous bit rate.

12. The method of claim 9, further comprising:
determining whether a video packet loss rate is above a packet loss threshold; and
based on the video packet loss rate being above the packet loss threshold, determining the first bit rate is less than the previous bit rate.

13. The method of claim 9, further comprising:
determining whether a buffer fill ratio of the video packet buffer is below the buffer fill threshold;
determining whether a video packet loss rate is below a packet loss threshold; and
based on the buffer fill ratio being below the buffer fill threshold and the video packet loss rate being below the packet loss threshold, determining the first bit rate is greater than the previous bit rate.

14. The method of claim 9, further comprising:
determining whether a current transmission rate is below the transmission rate threshold;
determining whether a transmission interval of consecutive video packets is above the transmission interval threshold;
determining whether a buffer fill ratio of the video packet buffer is below the buffer fill threshold; and
based on the transmission rate being below the transmission threshold, the transmission interval being above the transmission interval threshold, and the buffer fill ratio being below the buffer fill threshold, transmitting the first video packet.

15. The method of claim 14, further comprising:
transmitting the first video packet with the sending controller at the first transmission power.

16. The method of claim 14, further comprising:
recording a first timestamp to memory, the first timestamp indicating when the first video packet was transmitted by the sending controller.

* * * * *